July 17, 1962

R. H. HORTON 3,044,657

FLANGE AND WALL STRUCTURE

Filed June 14, 1957

INVENTOR.
RICHARD H. HORTON
BY
ATTORNEYS

July 17, 1962

R. H. HORTON 3,044,657

FLANGE AND WALL STRUCTURE

Filed June 14, 1957

INVENTOR.
RICHARD H. HORTON
BY

ATTORNEYS.

United States Patent Office 3,044,657
Patented July 17, 1962

3,044,657
FLANGE AND WALL STRUCTURE
Richard H. Horton, Cincinnati, Ohio, assignor, by mesne assignments, to the United States of America as represented by the Secretary of the Navy
Filed June 14, 1957, Ser. No. 665,875
3 Claims. (Cl. 220—80)

The present invention relates to structural joints and more particularly to a lightweight flange for use in making a high strength, gas tight joint.

Heretofore various devices have been used to make a structural joint between two wall sections. One commonly used structure joint for relatively thin-walled material comprised forming flanges on the edges of the material by reverse-bending, and then using clamping means to hold the sections in position. While this method of making a joint was well adapted for thin-walled material, it had little or no application for thick material due to the difficulty encountered in making the reverse-bended joints.

The present invention discloses a novel device for making a gas tight joint and is readily adaptable for use with very thick walls and with honeycomb walls, as may be found in gas turbine engines. The device comprises two flange rings each welded to one edge of separate walls to be joined. After welding, the flange rings are finished machined to provide a rabbeted joint. A nut, which is in the form of ring segments and which has a grooved top, is provided to wedge the rabbeted joints together when it is threadedly engaged with screws that pass through the flange rings.

It is therefore a general object of the present invention to provide an improved flange structure for joining walls together.

Another object of the present invention is to provide a lightweight flange for use in making a high strength, gas tight joint.

Another object of the present invention is to provide a structural flange for joining honeycombed wall structures wherein the flange is flush with the wall structure.

Still another object is to provide a structural joint for walls that is simple in nature and economical in cost.

Other objects and advantages of the present invention will be readily appreciated as the same becomes better understood by reference to the following detailed description when considered in connection with the accompany drawing wherein.

Figure 1:
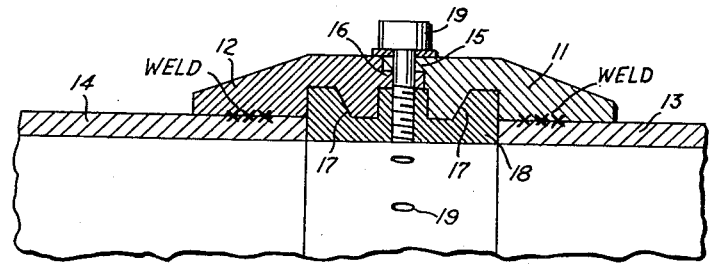
FIGURE 1 is a sectional view showing a single wedge type joint structure.

Referring now to the drawing, there is shown in FIGURE 1 an embodiment wherein annular rings 11 and 12 are attached, as by welding, to annular wall sections 13 and 14. After welding, rings 11 and 12 are finished machined to provide a rabbeted joint, as ring 11 has a flange portion 15 that overlaps a flange portion 16 on ring 12. Each ring is provided with a tapered surface 17 and an annular nut plate 18 has corresponding tapered surfaces that engage the rings 11 and 12. A plurality of screws 19 pass through the flange portions 15 and 16 and threadedly engage the annular nut plate 18. It can be seen that as the screws 19 are threaded into nut plate 18, the tapered portions of the nut plate force the rings 11 and 12 together to provide a gas tight seal. The annular nut plate 18 is preferably made in segments so as to facilitate assembly and to permit ready alignment of the holes in the annular rings and the tapped holes in the nut plate 18.

Figure 2:
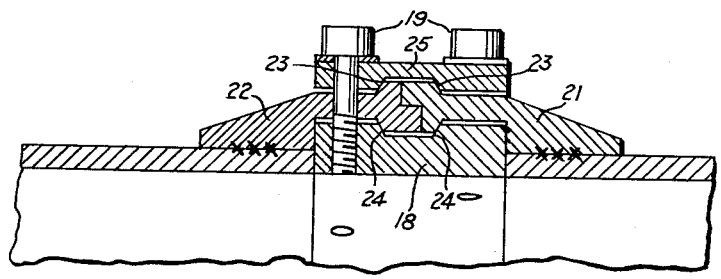
FIGURE 2 is a sectional view showing a double wedge type joint structure.

Another embodiment of the present invention is illustrated in FIGURE 2 of the drawing, wherein the annular rings 21 and 22 have tapered surfaces on both the inner and outer surface, as illustrated at 23 and 24. The inner tapered surfaces 23 are engageable with the tapered surfaces of annular nut plate 18, and wedge plate 25, having corresponding tapered surfaces, is engageable with the outer tapered surfaces of the annular rings. Thus it can be seen that when the plurality of screws 19 are threadedly engaged with nut plate 18, a double wedging action takes place to form a seal.

Figure 3:
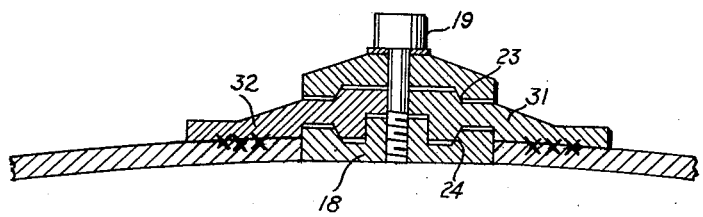
FIGURE 3 is a sectional view showing another embodiment of a double wedge type structure.

In FIGURE 3 of the drawing there is illustrated an embodiment of the present invention for providing a joint that is parallel with the longitudinal axis of a casing or container. The circular rings 31 and 32 are provided with both inner and outer tapered surfaces, as in the embodiment of FIGURE 2; however, in the embodiment illustrated in FIGURE 3 of the drawing there is a single row of screws 19 that engage with nut plate 18.

Figure 4:
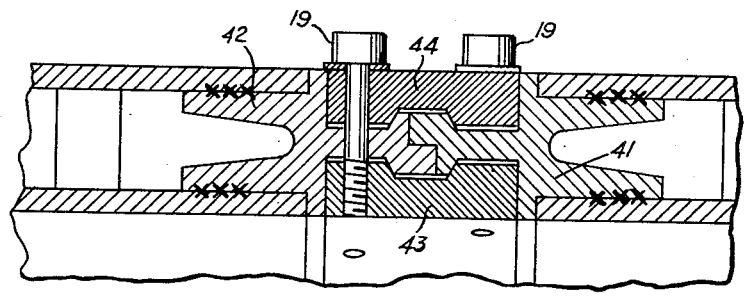
FIGURE 4 is a sectional view showing a double wedge type joint structure for honeycomb walls.
Figure 5:
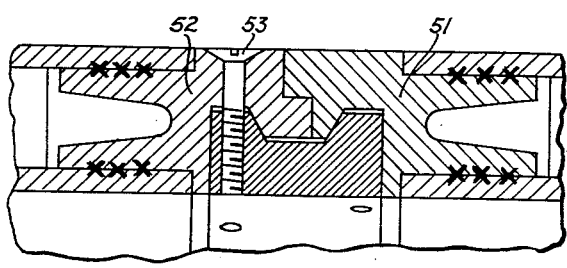
FIGURE 5 is a sectional view showing a single wedge type construction for honeycomb walls.
Figure 6:
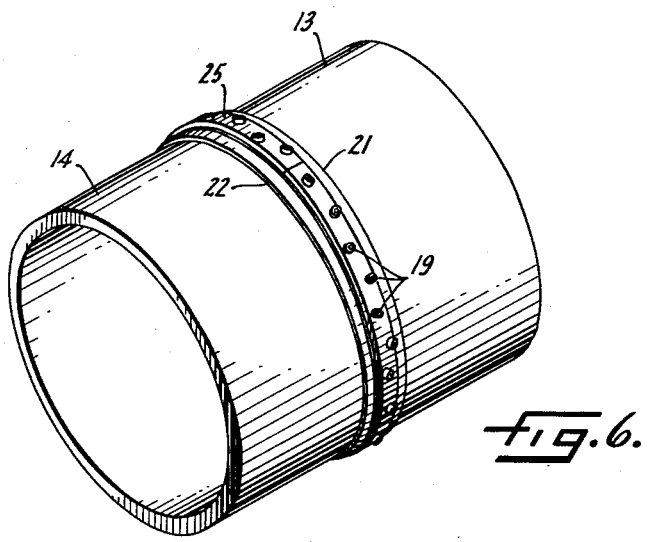
FIGURE 6 is a perspective view showing one embodiment of the present invention.

FIGURES 4 and 5 of the drawing illustrate embodiments of the present invention adaptable for use in honeycombed walls. In FIGURE 4 there is shown an embodiment somewhat similar to the embodiment shown in FIGURE 2 in that there is a double wedging action due to the flange plates 41 and 42 having tapered surfaces on both the inner and outer surfaces. The annular rings 41 and 42 are attached to the inner wall surfaces of the honeycombed wall sections and it can be seen that a smooth outer configuration is obtainable. A nut plate 43 and top wedge plate 44, having corresponding wedge surfaces engageable with the wedge surfaces on rings 41 and 42, are provided, and upon threading of screws 19 into nut plate 43 a double wedging action takes place.

In FIGURE 5 there is illustrated an embodiment wherein the flange plates 51 and 52 have a single tapered surface, and, by using flat head screws 53, it can be seen that there are no protrusions and that a smooth configuration is provided.

From the foregoing description of the several embodiments, it can be seen that a gas tight, structurally strong joint can be made for relatively thick material. Obviously many modifications and variations of the present invention are possible in the light of the above teachings. It is therefore to be understood that the invention may be practiced otherwise than as specifically described.

What is claimed is:

1. A flange construction for a high-pressure vessel having a split outer casing, a pair of external projections in abutment along the casing split line, and external fastening means for said projections, said flange construction comprising: a pair of rigid internal projections positioned adjacent said casing split line, said internal projections being in abutment and forming an interior seam in said casing; internal locking means adapted to co-operate with said internal projections to preload said external projections; and means for retaining said internal locking means inside said casing, said retaining means being operable to bring said locking means into engagement with said internal projections.

2. In a structure having axially aligned tubular cylindrical wall sections joined at their end edges,
   (a) a first annular ring circumferentially attached to one tubular wall section,
   (b) a second annular ring circumferentially attached to an adjacent tubular wall section,
   (c) each said annular ring having an annular wedging surface on its outer periphery flaring radially outwardly and axially away from the edge of the respective tubular wall section to which said ring is attached,
(d) each said annular ring having an annular wedging surface on its inner periphery tapering radially inwardly and axially away from the edge of the respective tubular wall section to which said ring is attached,
(e) a flange portion extending axially from each said annular ring in a direction away from the respective wall section to which the ring is attached, said flange portion on said first annular ring overlapping said flange portion on said second annular ring,
(f) a segmented cylindrical nut having inclined wedge surfaces corresponding to the inner annular wedging surfaces of said rings in contact with the inner annular wedging surfaces of said first and second annular rings,
(g) a segmented cylindrical wedge plate having inclined wedge surfaces corresponding to the outer annular wedging surfaces of said rings in contact with the outer annular wedging surfaces of said first and second annular rings, and
(h) threaded means drawing said nut and wedge plate together and clamping said first and second annular rings therebetween.

3. In a structure having axially aligned tubular cylindrical honeycombed wall sections joined at their end edges,
(a) a first annular ring circumferentially attached to the inner surfaces of the spaced parallel boundary walls of one tubular honeycombed wall section,
(b) a second annular ring circumferentially attached to the inner surfaces of the spaced parallel boundary walls of an adjacent tubular honeycombed wall section,
(c) each said annular ring having an annular wedging surface on its outer periphery flaring radially outwardly and axially away from the edge of the respective tubular wall section to which said ring is attached,
(d) each said annular ring having an annular wedging surface on its inner periphery tapering radially inwardly and axially away from the edge of the respective tubular wall section to which said ring is attached,
(e) a flange portion extending axially from each said annular ring in a direction away from the respective wall section to which the ring is attached, said flange portion on said first annular ring overlapping said flange portion on said second annular ring,
(f) a segmented cylindrical nut having inclined wedge surfaces corresponding to the inner annular wedging surfaces of said rings in contact with the inner annular wedging surfaces of said first and second annular rings,
(g) a segmented cylindrical wedge plate having inclined wedge surfaces corresponding to the outer annular wedging surfaces of said rings in contact with the outer annular wedging surfaces of said first and second annular rings, and
(h) a plurality of screws passing through said wedge plate and said annular rings and threadedly engaging said segmented cylindrical nut and drawing said nut and wedge plate together thereby biasing said annular rings in sealing relation.

References Cited in the file of this patent
UNITED STATES PATENTS

| | | |
|---|---|---|
| 821,027 | Dock | May 22, 1906 |
| 1,919,780 | Fairbank | July 25, 1933 |
| 2,276,603 | Willis | Mar. 17, 1942 |
| 2,362,902 | Jansen | Nov. 14, 1944 |
| 2,727,286 | Moore | Dec. 20, 1955 |